(12) United States Patent
Roberts et al.

(10) Patent No.: US 11,542,796 B2
(45) Date of Patent: Jan. 3, 2023

(54) MAGNETIC CATCH FOR PLUNGER LIFT

(71) Applicant: PCS Ferguson, Inc., Frederick, CO (US)

(72) Inventors: Paul T. Roberts, Frederick, CO (US); Christopher A. Velasquez, Farmington, NM (US)

(73) Assignee: PCS FERGUSON, INC., Frederick, CO (US)

( * ) Notice: Subject to any disclaimer, the term of this patent is extended or adjusted under 35 U.S.C. 154(b) by 454 days.

(21) Appl. No.: 16/598,242

(22) Filed: Oct. 10, 2019

(65) Prior Publication Data

US 2020/0116303 A1   Apr. 16, 2020

Related U.S. Application Data

(60) Provisional application No. 62/743,689, filed on Oct. 10, 2018.

(51) Int. Cl.
| | | |
|---|---|---|
| E21B 43/12 | (2006.01) | |
| F16N 29/02 | (2006.01) | |
| F04B 47/12 | (2006.01) | |
| F04B 49/00 | (2006.01) | |

(52) U.S. Cl.
CPC ............ *E21B 43/121* (2013.01); *F04B 47/12* (2013.01); *F04B 49/00* (2013.01); *F16N 29/02* (2013.01)

(58) Field of Classification Search
CPC ........ F16N 29/02; E21B 43/121; E21B 43/13; F04B 47/12
See application file for complete search history.

(56) References Cited

U.S. PATENT DOCUMENTS

| | | | |
|---|---|---|---|
| 7,556,100 B2 * | 7/2009 | Steiner .................. | E21B 33/068 166/107 |
| 10,246,976 B2 * | 4/2019 | DeCarlo ............... | E21B 43/121 |

* cited by examiner

*Primary Examiner* — Nicole Coy
*Assistant Examiner* — Nicholas D Wlodarski
(74) *Attorney, Agent, or Firm* — Snell & Wilmer L.L.P.; Kent A. Lembke

(57) ABSTRACT

Provided herein, is magnetic catch assembly that may be utilized with and/or incorporated into lubricator of a wellhead. The magnetic catch assembly permits maintaining a plunger within the lubricator without requiring any moving mechanical components.

19 Claims, 6 Drawing Sheets

MAGNETIC CATCH FOR PLUNGER LIFT

CROSS-REFERENCE TO RELATED APPLICATIONS

This application claims the benefit of priority to U.S. Provisional Application No. 62/743,689, filed Oct. 10, 2018, the entire contents of which are incorporated herein by reference in their entireties.

FIELD

The present disclosure broadly relates to a plunger lift apparatus for hydrocarbon wells. More specifically the disclosure is directed to a catch assembly that, at the surface, receives a plunger from production tubing, holds the plunger, and releases the plunger into the production tubing. In an embodiment, the catch assembly utilizes an electromagnet capture and hold the plunger.

BACKGROUND

A plunger lift is an apparatus that can be used to increase the productivity of oil and gas wells. In the early stages of a well's life, liquid loading may not be a problem. When production rates are high, well liquids are typically carried out of the well tubing by high velocity gas. As a well declines and production decreases, a critical velocity is reached wherein heavier liquids may not make it to the surface and start falling back to the bottom of the well exerting pressure on the formation, thus loading up the well. As a result, the gas being produced by the formation can no longer carry the liquid being produced to the surface. As gas flow rate and pressures decline in a well, lifting efficiency can decline substantially.

A plunger lift system can act to remove accumulated liquid in a well. That is, a plunger lift may unload a gas well and, in some instances, unload the gas well without interrupting production. A plunger lift system utilizes gas present within the well as a system driver. A plunger lift system works by cycling a plunger into and out of the well. During a cycle, a plunger typically descends to the bottom of a well passing through fluids within the well. Once the liquids are above the plunger, these liquids may be picked up or lifted by the plunger and brought to the surface, thus removing most or all liquids in the production tubing. The gas below the plunger will push both the plunger and the liquid on top of the plunger to the surface completing the plunger cycle. As liquid is removed from the tubing bore, an otherwise impeded volume of gas can begin to flow from a producing well. The plunger can also keep the tubing free of paraffin, salt or scale build-up.

SUMMARY

Provided herein, is magnetic catch assembly that may be utilized with and/or incorporated into lubricator of a wellhead. The magnetic catch assembly permits maintaining a plunger within the lubricator without requiring any moving mechanical components.

In an arrangement, the magnetic catch assembly is an electromagnet that is activated to generate a magnetic field to capture and hold a plunger and deactivated to release the plunger.

In an arrangement, the electromagnet applies the magnetic field to a receiving tube of a lubricator. In a further arrangement, a portion of the receiving tube forms a core of the electromagnet.

In an arrangement, the electromagnet is activated in response to an arrival sensor.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 1:
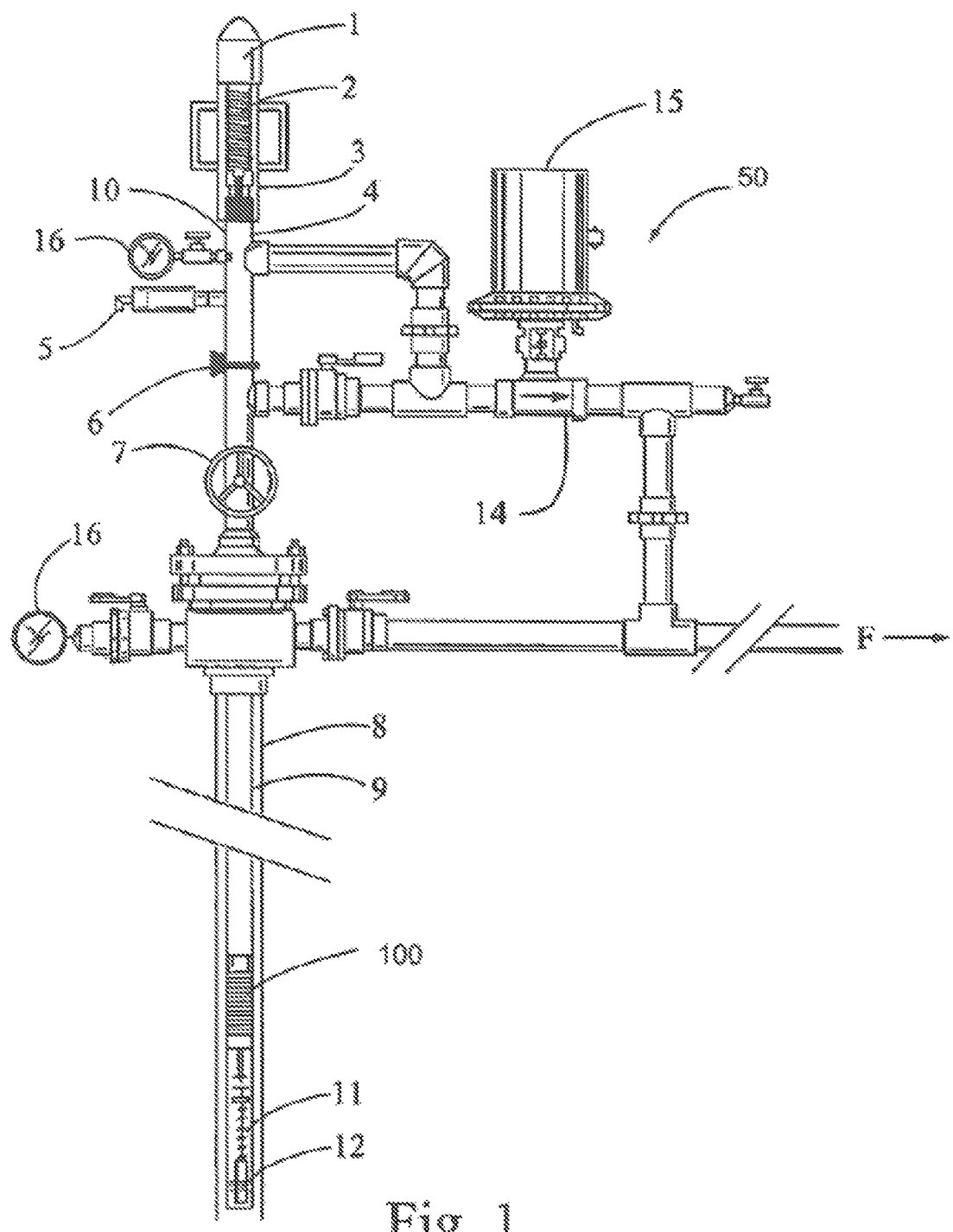
FIG. 1 illustrates an exemplary plunger lift system installation.

A typical installation plunger lift system 50 can be seen in FIG. 1. The system includes what is termed a wellhead assembly or lubricator assembly 10 disposed on the surface above a well bore including casing 8 and production tubing 9. The lubricator assembly 10 is operative to receive a plunger 100 from the production tubing 9 and release the plunger 100 into the production tubing 9 to remove fluids (e.g., liquids) from the well. Fluid accumulating above of the plunger 100 at the bottom of the well may be carried to the top of the well by the plunger 100. Specifically, after passing though the liquids at the bottom of the well, gasses accumulate under the plunger and lift the plunger and the fluid above the plunger to the surface. The lubricator assembly 10 typically controls the cycling of the plunger into and out of the well. In the illustrated embodiment, the lubricator assembly 10 includes a cap 1, top bumper spring 2, striking pad 3, and a receiving tube 4, which is aligned with the production tubing.

In some embodiments, the lubricator assembly 10 contains a plunger auto catching device or catcher 5 and/or a plunger sensing device 6. The sensing device 6 sends a signal to a surface controller 15 upon plunger 100 arrival at the top of the well and/or dispatch of the plunger 100 into the well. One embodiment of such a sensor is set forth in co-owned U.S. Pat. No. 9,850,746, the entire contents of which is incorporated herein by reference. The controller 15 may activate and/or deactivate the catcher 5 to capture, hold and/or release the plunger. Once received at the surface, the plunger may be immediately dispatched back into the well or held until a subsequent plunger cycle time.

When utilized, the output of the sensing device 6 may be used as a programming input to achieve the desired well production, flow times and wellhead operating pressures. A master valve 7 allows for opening and closing the well. Typically, the master valve 7 has a full bore opening equal to the production tubing 9 size to allow passage of the plunger 100 there through. The bottom of the well is typically equipped with a seating nipple/tubing stop 12. A spring standing valve/bottom hole bumper assembly 11 may also be located near the tubing bottom. The bumper spring is located above the standing valve and can be manufactured as an integral part of the standing valve or as a separate component of the plunger system.

Surface control equipment usually consists of motor valve(s) 14, sensors 6, pressure recorders 16, etc., and an electronic controller 15 which opens and closes the well at the surface. Well flow 'F' proceeds downstream when surface controller 15 opens well head flow valves. Controllers operate based on time, or pressure, to open or close the surface valves based on operator-determined requirements for production. Alternatively, controllers may fully automate the production process.

Figure 2:
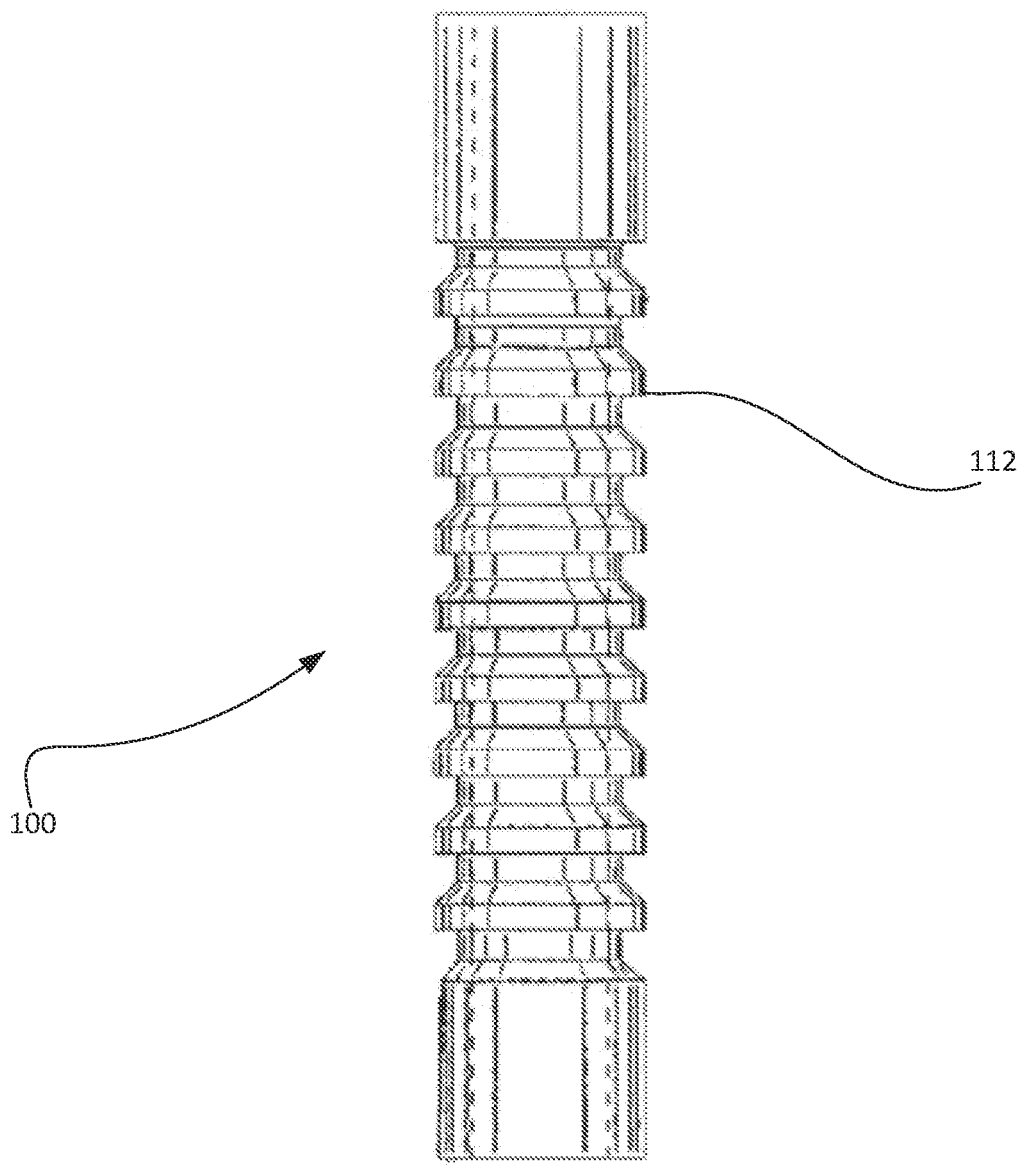
FIG. 2 illustrates an exemplary plunger

FIG. 2 illustrates one non-limiting embodiment of a plunger 100. In the illustrated embodiment, the plunger 100 is defined by a generally cylindrical body section having a sidewall with a repeating series of grooves and detents (e.g., rings 112) where the rings are sized to create a seal with the interior surface of production tubing. Plungers can be designed with various sidewall or sleeve geometries and a plunger with any such sidewall geometries may be utilized.

Figure 3:
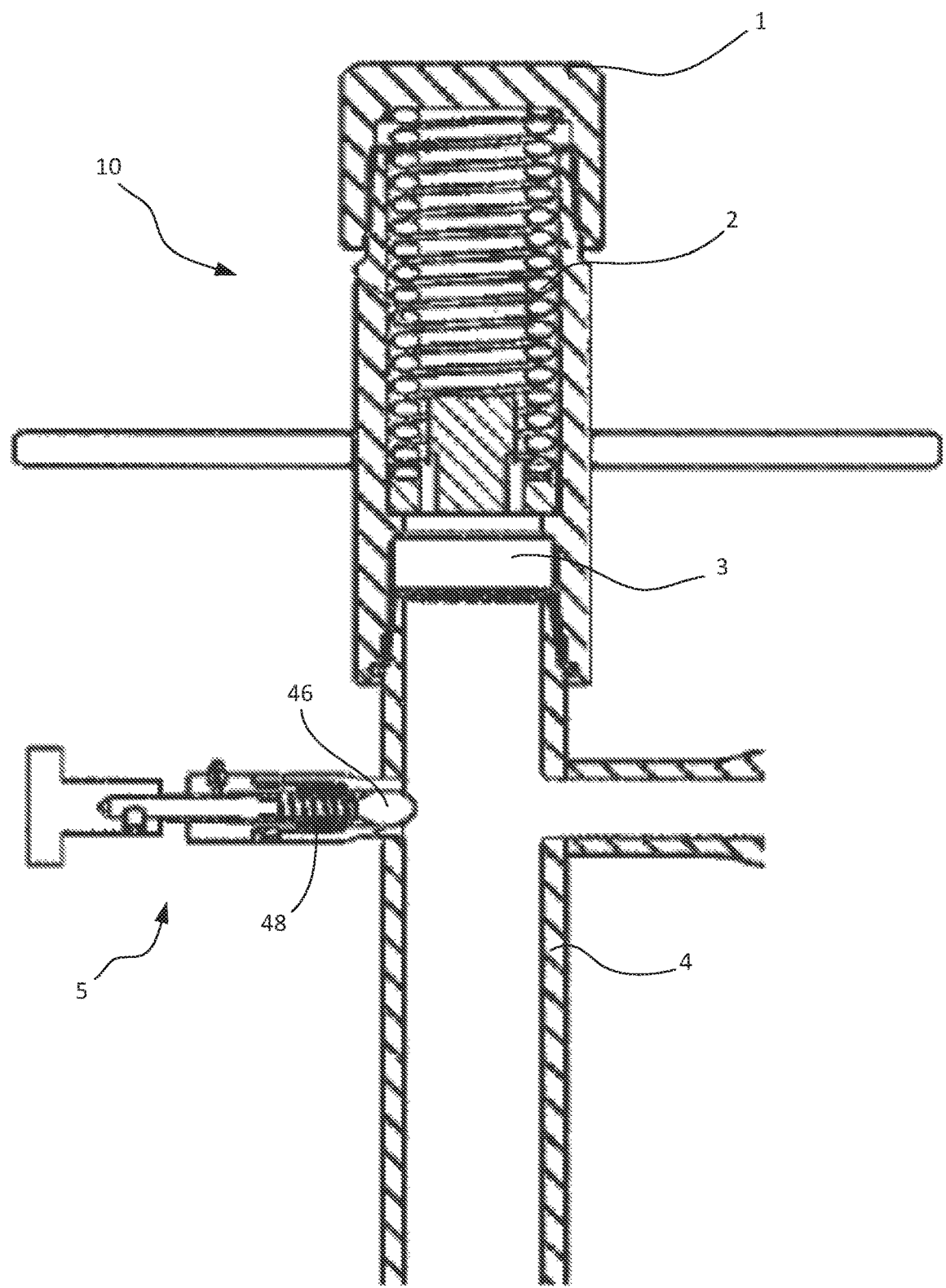
FIG. 3 illustrates a conventional catch assembly.

As shown in FIG. 3, the catcher 5 is typically integrated into the receiving tube 4 of the lubricator. The catcher 5 typically engages the body section of the plunger. FIG. 2 illustrates a conventional design of a catcher 5. In such an embodiment, for example, the catcher 5 has a biased ball 46 that can engage the body of the plunger 100 and hold it. For example, the ball 46 can engage in grooves or detents of the cylindrical body section of the plunger 100 or in some other suitable profile or shoulder. Typically, the catcher 5 is automated such that the catcher 5 can automatically catch the plunger 100 when it arrives at the surface during a lift cycle. The sensor 6 sensor can be used to detect the plunger's arrival if necessary.

For such an automated catcher 5, a spring and piston arrangement 48 can bias the ball 46 using compressed gas from a source controlled by the controller. The pressure can be applied to the spring and piston arrangement 48 using any appropriate device. With pressure applied, the ball 46 forces into the lubricator's pathway so the ball 46 can engage the plunger 100. The controller can release gas pressure from the spring and piston arrangement 48. At this point, the weight of the plunger 100 can push the ball 46 out of the way so the plunger 100 is free to fall into the well. Other means for biasing the ball (electric actuators) may be used as well.

While providing an effective means for securing a plunger at a wellhead (e.g., within a lubricator), the use of a catcher that extends into and retracts from the interior of the receiving tube 4 provides a point of entry into the generally pressurized wellhead assembly. Accordingly, such catchers require various seals to prevent leakage. However, such seals are prone to wear and require periodic maintenance. Stated otherwise, such catchers provide a potential point of leakage, which may result in environmental contamination.

Figure 4A:
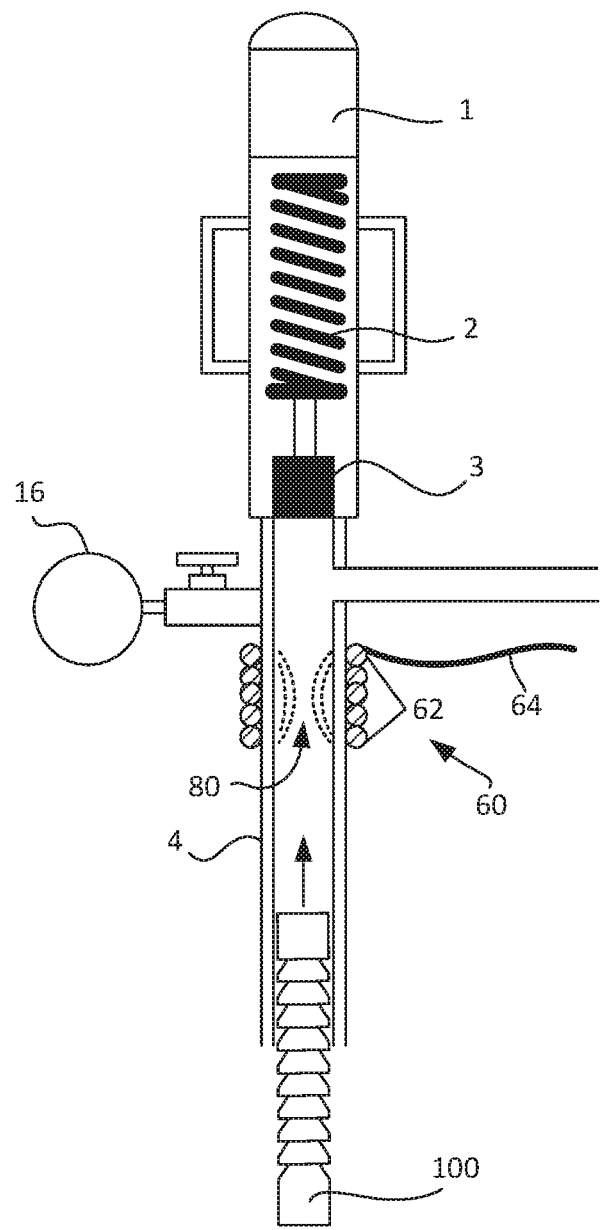
FIGS. 4A-4C illustrate an electromagnetic catch assembly incorporated into a lubricator during plunger arrival, plunger hold, and plunger release, respectively.

In an embodiment, the present disclosure is directed to a catcher that catches a plunger within a well head assembly (e.g., lubricator) without requiring any penetration through a catch or receiving tube. As illustrated in FIG. 4A, an electromagnetic catch assembly 60 is integrated into a receiving tube 4 of the lubricator 10. Though shown in cross-section, it will be appreciated that the electromagnetic catch assembly 60 may encircle the catch tube 4. In the illustrated embodiment, the catch assembly 60 includes an electromagnet 62 that generates a magnetic field 80 in response to an electric current provided to the electromagnet 62 via a connection 64 to an electrical power source (not shown). The magnetic field disappears when the current is turned off. See, e.g., FIG. 4C. The controller (e.g., see FIG. 1) may activate and deactivate the electromagnet 62. That is, the controller may control the supply of electric current to the electromagnet 62.

Electromagnets usually consist of wire or cable wound into a coil. A current through the wire/cable creates a magnetic field which is concentrated in the center of the coil. The wire turns are often wound around a magnetic core made from a ferromagnetic material such as iron. In an embodiment, the electromagnet 62 may be defined by coiling a wire/cable around the ferromagnetic receiving tube 4 such that the receiving tube is the core of the electromagnet 62. In other embodiments, one or more electromagnets (e.g., having separate cores) may be applied around the periphery of the receiving tube. In a further embodiment, the catch assembly may be formed of a short length of tubing having a matching size of the receiving tube. In such an arrangement, the receiving tube and catch assembly may be connected (e.g., via matching flanges, etc.). In any embodiment, the magnetic field of the electromagnet 62 can be quickly changed by controlling the amount of electric current in the winding.

Figure 4B:
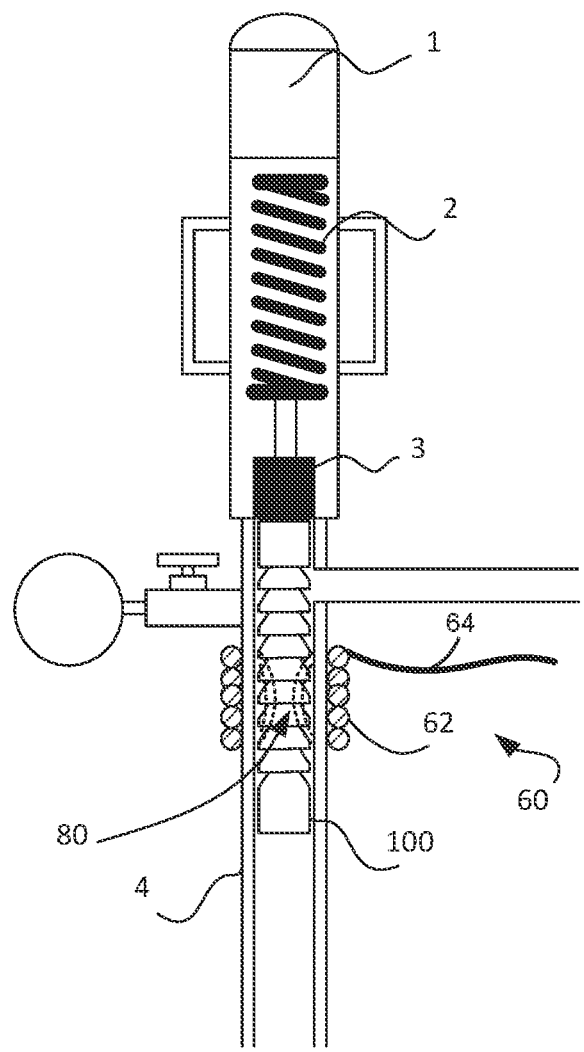
Figure 4C:
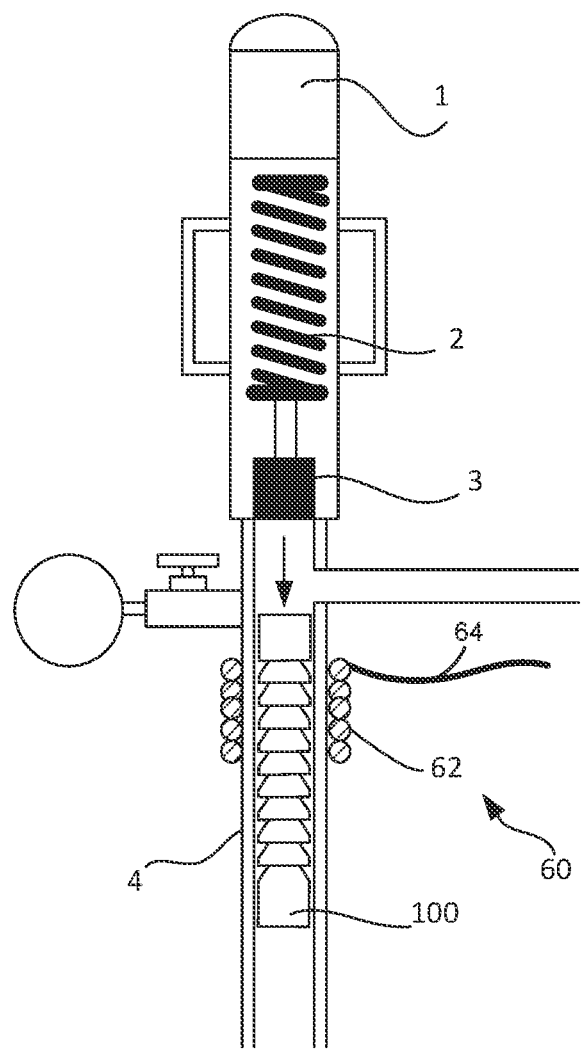

FIG. 4A illustrates a lubricator 10 incorporating a magnetic catch assembly 60 during plunger arrival. As shown, and incoming plunger 100 is identified by the sensor 6 which sends a signal to the controller (not shown). The controller activates electromagnet 62 to generate the magnetic field 80. As shown in FIG. 4B the plunger 100 continues into the lubricator until it strikes the striking pad 3. At this time, the plunger 100, which is necessarily a ferromagnetic plunger for use in the presented system, is within the magnetic field 80. Once disposed within the magnetic field 80, magnetic attraction between the plunger 100 and the electromagnet maintains the plunger 100 within the lubricator 10 until the magnetic field 80 is turned off/deactivated. In this regard, it will be appreciated that a continuous supply of current must be provided to maintain the magnetic field. As shown in FIG. 4C, the controller deactivates the magnetic field which allows the plunger 100 to fall back into the production tubing.

Of note, various plunger arrival sensors utilize magnetic sensors to identify an arriving plunger. In such an arrangement, the controller may deactivate the plunger arrival sensor in conjunction with the activation of the electromagnet. Such sensor deactivation may prevent any damage to or mis-calibration of magnetic sensors of the arrival sensor due to a large magnetic field generated by the electromagnet. Accordingly, the arrival sensor may be reactivated with the deactivation of the electromagnet.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

The invention claimed is:

1. A lubricator system for use at a well head of a hydrocarbon well, the lubricator system comprising:
   a receiving tube having an upper end, an open lower end and a hollow interior, the open lower end and hollow interior sized to receive a plunger from production tubing disposed below the receiving tube; and
   a plunger catcher comprising an electromagnet with disposed outside the hollow interior of the receiving tube;
   a plunger retention configuration comprising the electromagnet being operable to controllably generate a magnetic field within the receiving tube to prevent said plunger from falling into the production tubing when disposed in the magnetic field; and
   a plunger release configuration comprising the magnetic field within the receiving tube being deactivated to release said plunger and allow said plunger to move back into the production tubing.

2. The system of claim 1, further comprising:
   a shock absorber assembly mountable above the receiving tube.

3. The system of claim 1, wherein the electromagnet comprises:
   a coil of wires disposed around an outside surface of the receiving tube over a portion of a length of the receiving tube.

4. The system of claim 1, wherein the electromagnet comprises:
   one or more electromagnets and cores disposed about a surface of the receiving tube.

5. The system of claim 1, wherein the electromagnet comprises:
   a tubular element disposed in-line with the receiving tube.

6. The system of claim 1, further comprising:
   a controller; and
   an arrival sensor.

7. The system of claim 6, wherein the controller is operative to selectively connect the electromagnet to a power source and disconnect the electromagnet from the power source.

8. The system of claim 7, wherein the controller selectively connects and disconnects the electromagnet based at least in part on signals from the arrival sensor.

9. A lubricator system for use at a well head of a hydrocarbon well, the lubricator system comprising:
   a tube comprising a hollow interior and an open lower end;
   a plunger catcher, wherein an entirety of the plunger catcher is disposed outside the hollow interior of the tube such that no portion of the plunger catcher penetrates the tube to access the hollow interior, and wherein the plunger catcher comprises an electromagnet;
   a plunger retention configuration comprising the electromagnet being operable to generate a magnetic field within the hollow interior of the tube; and
   a plunger release configuration comprising the magnetic field within the hollow interior of the tube being deactivated.

10. The system of claim 9, further comprising:
    a plunger movable relative to and disposable within the hollow interior of the tube.

11. The system of claim 10, wherein the plunger is disposed within the magnetic field when the system is in the plunger retention configuration to retain the plunger in a fixed position relative to the tube.

12. The system of claim 11, wherein the plunger is movable relative to and along the tube when the system is in the plunger release configuration.

13. The system of claim 9, further comprising:
    a shock absorber assembly mountable above an upper end of the tube.

14. The system of claim 9, wherein the electromagnet comprises:
    a coil of wires disposed around an outside surface of the tube over a portion of a length of the tube.

15. The system of claim 9, wherein the electromagnet comprises:
    one or more electromagnets and cores disposed about a surface of the tube.

16. The system of claim 9, further comprising:
    a controller; and
    an arrival sensor.

17. The system of claim 16, wherein the controller is operative to selectively connect the electromagnet to a power source and disconnect the electromagnet from the power source.

18. The system of claim 17, wherein the controller selectively connects and disconnects the electromagnet based at least in part on signals from the arrival sensor.

19. A method of operating a lubricator system at a well head of a hydrocarbon well, comprising:
    lifting a plunger within production tubing;
    moving said plunger from said production tubing into a tube of said lubricator system;
    generating a magnetic field within said tube and comprising activating an electromagnet;
    exposing said plunger to said magnetic field within said tube;
    retaining said plunger at a fixed position within said tube using said exposing;
    terminating said magnetic field; and
    releasing said plunger back into said production tubing after said terminating.

* * * * *